March 17, 1936.  A. P. DIESCHER  2,034,132

TUBE MAKING APPARATUS

Filed Jan. 31, 1933  9 Sheets-Sheet 1

INVENTOR
August P. Diescher
BY
Brown, Critchlow & Flick
ATTORNEYS

March 17, 1936. A. P. DIESCHER 2,034,132
TUBE MAKING APPARATUS
Filed Jan. 31, 1933 9 Sheets-Sheet 2

INVENTOR
August P. Diescher
BY Brown, Critchlow & Flick
ATTORNEYS

March 17, 1936.    A. P. DIESCHER    2,034,132
TUBE MAKING APPARATUS
Filed Jan. 31, 1933    9 Sheets-Sheet 4

INVENTOR
August P. Diescher
BY
Brown, Critchlow & Flick
ATTORNEYS

March 17, 1936.　　A. P. DIESCHER　　2,034,132
TUBE MAKING APPARATUS
Filed Jan. 31, 1933　　9 Sheets-Sheet 6

INVENTOR
August P. Diescher
BY
Brown, Critchlow & Flick
ATTORNEYS March 17, 1936.   A. P. DIESCHER   2,034,132
TUBE MAKING APPARATUS
Filed Jan. 31, 1933   9 Sheets-Sheet 7

INVENTOR
August P. Diescher
BY
Brown, Critchlow & Fleck
ATTORNEYS

March 17, 1936.  A. P. DIESCHER  2,034,132
TUBE MAKING APPARATUS
Filed Jan. 31, 1933  9 Sheets-Sheet 8

INVENTOR
August P. Diescher
BY Brown, Critchlow & Flick
ATTORNEYS

March 17, 1936.  A. P. DIESCHER  2,034,132
TUBE MAKING APPARATUS
Filed Jan. 31, 1933  9 Sheets-Sheet 9

INVENTOR
August P. Diescher
BY
Brown, Critchlow & Flick
ATTORNEYS

Patented Mar. 17, 1936

2,034,132

UNITED STATES PATENT OFFICE 2,034,132

TUBE MAKING APPARATUS

August P. Diescher, Pittsburgh, Pa., assignor to Diescher Tube Mills, Inc., Pittsburgh, Pa., a corporation of Delaware Application January 31, 1933, Serial No. 654,404

5 Claims. (Cl. 80—13)

My invention relates to apparatus for making tubes, and particularly to apparatus associated with cross-rolls for treating tubing.

In the operation of cross-rolls for treating tubes, particularly of the seamless type, the tubes are actuated through the cross-rolls with a helical movement. That is, the tube is advanced longitudinally while it is rotated about its longitudinal axis. The rate of rotation is relatively high, and if the rapidly rotating tubes engage surfaces that are stationary with respect to such rotative movement, there is a possibility that the tubes will be marred or scored on their outer surfaces, and it is highly desirable that this be avoided.

In accordance with the present invention, I provide that the rapidly rotating tubes emerging from the cross-rolls are received by a series of rollers that are adapted to rotate freely in planes that approximately coincide with the direction of movement of the contacting surface of the tubes. In other words, the axes of these receiving rollers are approximately perpendicular to the direction of movement of any given point on the surface of the tubes when in engagement with the rollers.

Accordingly, when tubes are received by rollers of the character above described, the rollers are actuated by the rapidly rotating tube, and there is no harmful relative movement with respect to the surfaces in engagement with the tubes, and accordingly there is substantially no tendency to mar or scratch the surfaces of the tubes. Most desirably, the angles of these receiving rollers may be adjusted in order to conform to the various angles of the helical paths of movement that obtain with respect to tubes under varying operating conditions. I further provide a series of conveying rollers that are power-driven and that are adapted to engage the tubes after the latter have substantially ceased rotating. The relative vertical positions of the conveying rollers with respect to the receiving rollers are controlled for the purpose of selectively determining whether the receiving rollers or the conveying rollers are in engagement with the tubes. The conveying rollers operate in the usual manner after they are placed in engagement with the tubes to convey them longitudinally away from the cross-rolls in accordance with the operation of the usual receiving or delivery table.

The details of my invention will be described in connection with the accompanying drawings, in which.

Figures 1, 2, 3, 4, 5:
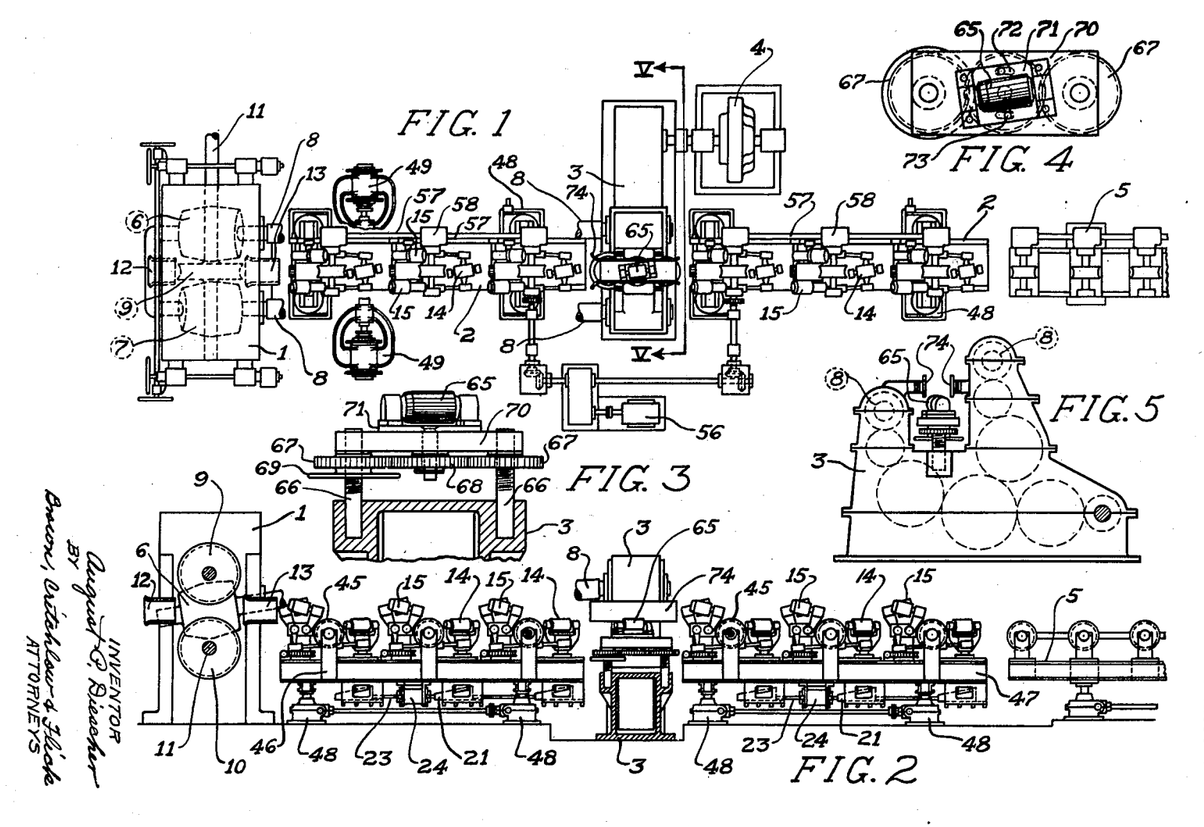
Fig. 1 is a plan view of a pair of cross-rolls and associated apparatus for receiving tubes treated thereby.
Fig. 2 is a view in elevation of a major portion of the apparatus of Fig. 1, parts being shown in section.
Fig. 3 is a vertical sectional view of a portion of the gear stand of Fig. 2 with a roller and its adjusting mechanism mounted thereon.
Fig. 4 is a plan view of the mechanism of Fig. 3.
Fig. 5 is a view partially in side elevation and partially in section on line V—V of Fig. 1, of the gear stand and associated apparatus.

Referring particularly to Figs. 1 and 2, tube-making apparatus in accordance with my invention comprises a mill 1 of the cross-roll type, a delivery table 2 for receiving the completed tubes from the mill, a gear stand 3 through which power is transmitted from a motor 4 to the rolls of mill 1, and a conveying table 5 for receiving the tubes from the delivery table 2.

The mill 1, which may be in general similar to that shown and described in the patent to S. E. Diescher, No. 1,870,209, granted August 2, 1932, comprises a pair of oppositely disposed cross-rolls 6 and 7 having their axes inclined to each other and to the line of feed of a blank between them. The cross-rolls 6 and 7 are adapted to be driven from the gear stand 3 by means of spindles 8. Two adjustably mounted grooved guide rolls or disks 9 and 10 are arranged on opposite sides of the pass between the cross-rolls and are adapted to rotate on horizontal axes and to be driven in any suitable manner, as by means of shafts 11.

The mill is also provided at the front and the rear portions of the pass with hollow guide members 12 and 13 by means of which a tube and its mandrel may be caused to assume the proper alignment for passage through the mill.

The receiving table 2, or delivery table, which is illustrated in Figs. 1 and 2, and enlarged details of which are shown in Figs. 6 and 9 to 19, inclusive, comprises two sections that are separated by the gear stand 3. Each section consists of any suitable number of units of rollers, three units being shown by way of example. Each unit comprises three receiving rollers and a conveying roller.

Figure 11:
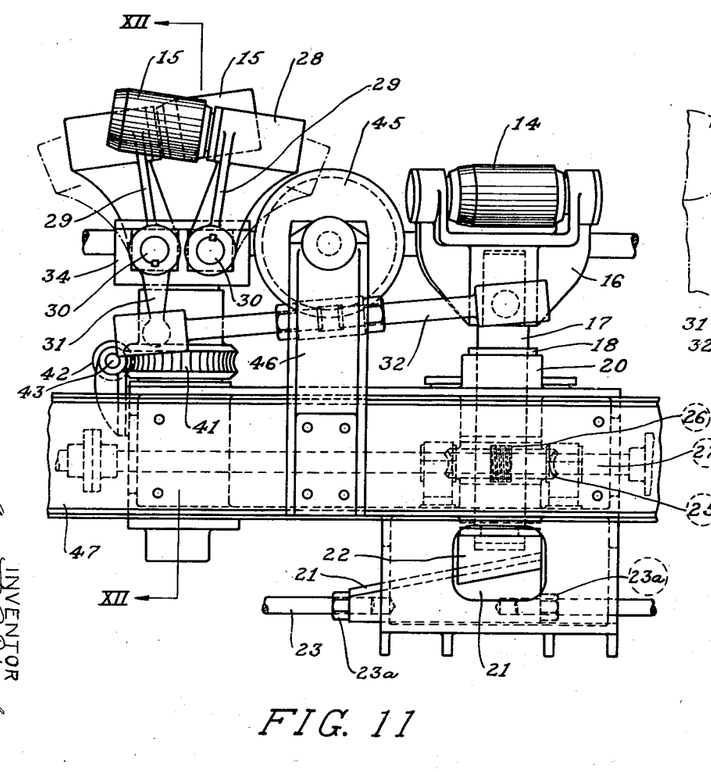
Fig. 11 is a further enlarged side elevational view of a unit of the receiving table, illustrating the details of the mechanisms for varying the angles of the receiving rollers and for controlling the relative heights of the receiving and the conveying rollers.
Figure 13:
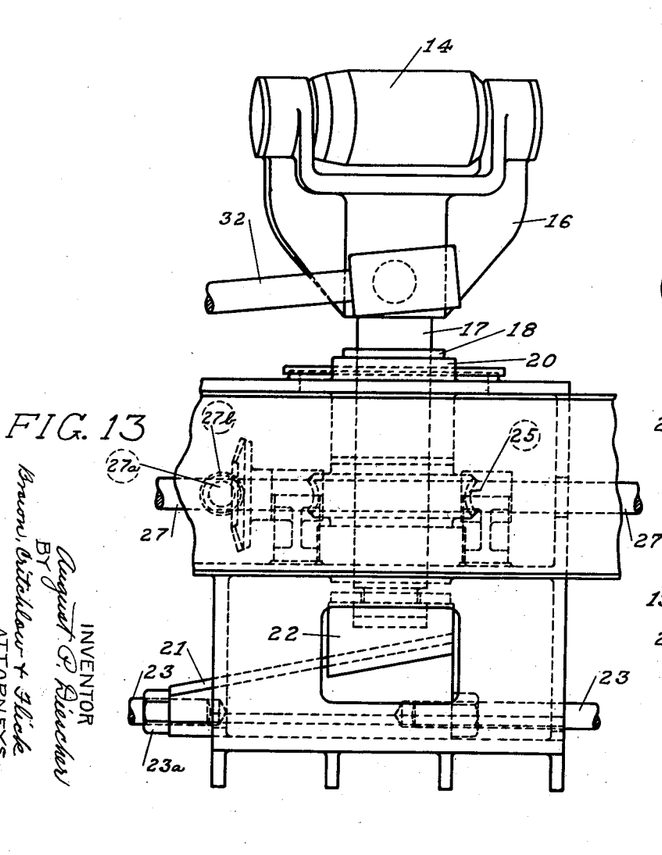
Figs. 13 and 14 are respectively side elevational and vertical sectional views of the details of the mechanism for adjusting the angular and the vertical positions of a receiving roller for supporting tubes.
Figure 14:
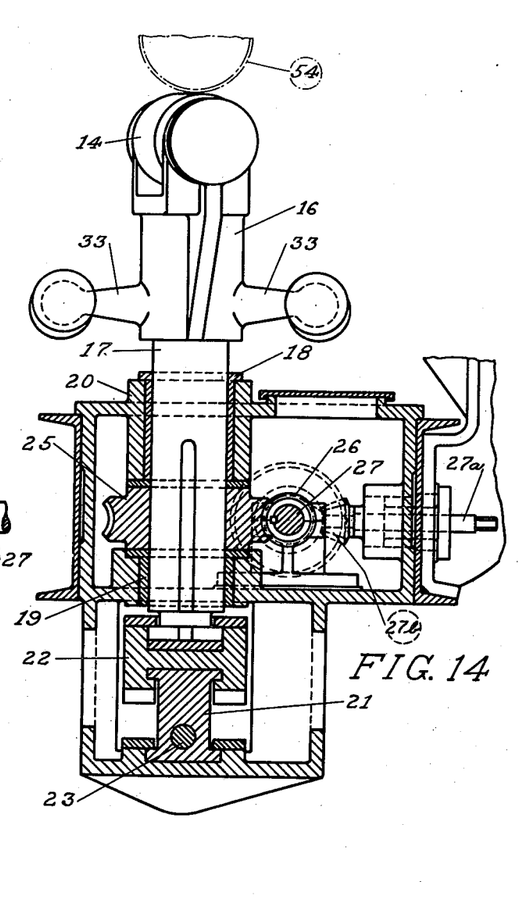
Figure 15:
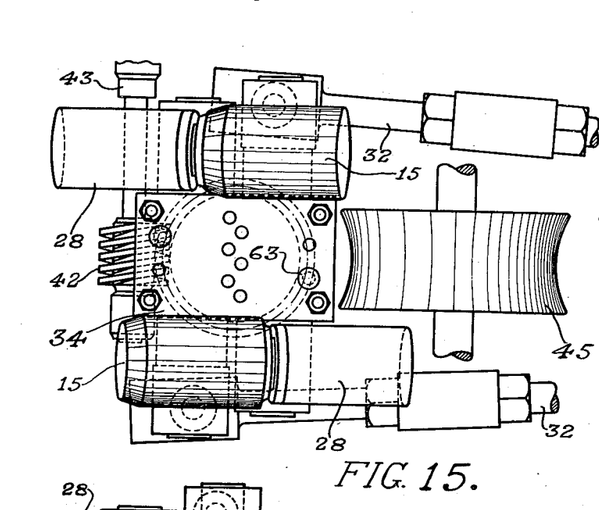
Figs. 15 and 16 are enlarged plan views of details of certain of the mechanism for controlling the positions of the receiving rollers.
Figure 16:
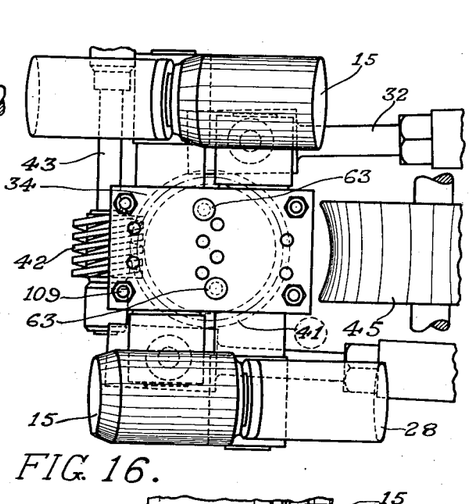
Figures 17, 19:
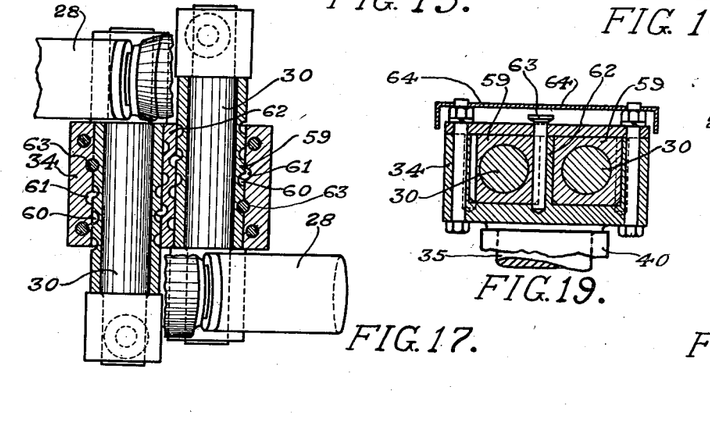
Fig. 17 is a view partially in plan and partially in horizontal section of mechanism for adjusting the horizontal distances between the receiving rollers for engaging the sides of tubes.
Fig. 19 is a vertical sectional view taken on line XIX—XIX of Fig. 18.
Figure 18:
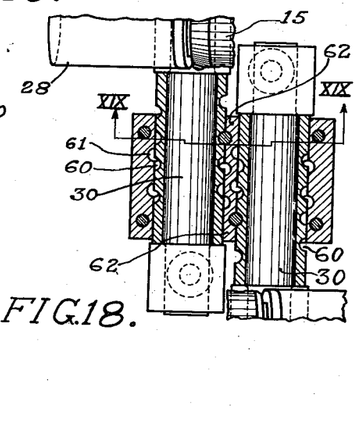
Fig. 18 is a view similar to Fig. 17 showing the parts in different relative positions.

The receiving rollers of each unit comprise a bottom supporting roller 14 and two spaced side rollers 15 for guiding a tube supported by the roller 14. As best shown in Figs. 11, 13 and 14, the roller 14 is mounted upon a yoke 16 supported by a vertical post 17 that is slidably and rotatably mounted in two sleeves 18 and 19 that are mounted in a housing 20.

As shown in Figs. 13 and 14, the vertical position of the post 17 is controlled by means of a horizontally movable wedge 21 that has a grooved slidable connection to the lower inclined surface of a block 22 to which the post 17 is rigidly connected. The wedges 21 for the several posts 17 are adjustably connected by means of links 23 having oppositely threaded end portions with jam nuts 23a thereon, to the piston of a fluid pressure cylinder 24, Fig. 9, that is controlled by any suitable means adjacent the operator. The posts 17 and the rollers 14 supported thereon may thus be raised or lowered simultaneously.

The axis of each of the rollers 14 is substantially horizontal, but at an angle to the axis of a tube thereon that corresponds substantially to the angle of the helical movement of the tube. The angular position of each roller 14 may be adjusted by means of a worm gear 25, Figs. 11, 13 and 14, slidably keyed to the post 17 between the inner ends of the sleeves 18 and 19 and that is rotated by a worm 26 on a shaft 27.

The shaft 27 connects the worms 26 of the units of the section, and all of the rollers 14 may be adjusted angularly simultaneously by means of a shaft 27a, Fig. 14, having a square end and that is connected by a bevel gear mechanism 27b to the shaft 27.

Figure 12:
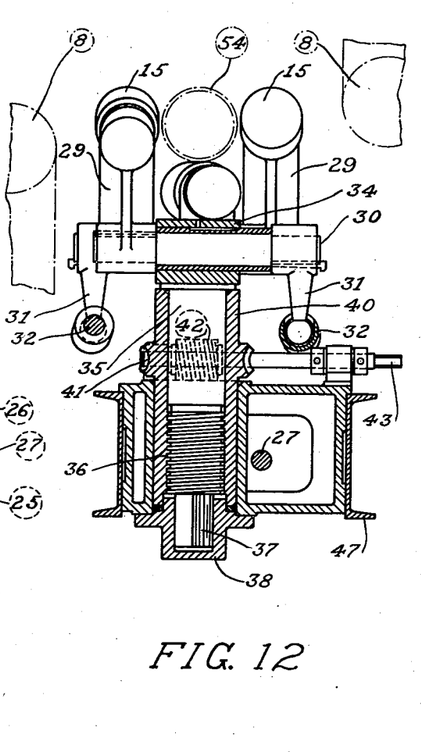
Fig. 12 is a view partially in end elevation and partially in vertical section taken on line XII—XII of Fig. 11.

As shown in Figs. 11 and 12, the side rollers 15 are each supported by a bearing housing 28 carried by an arm 29 extending at right angles from a rock shaft 30. The shafts 30 extend side-by-side transverse to the table 2, and each is provided with a depending rocker arm 31 that is connected by a link 32 having a socket connection to one of two oppositely disposed arms 33, Fig. 14, on the yoke 16. The links 32 are thus connected to opposite sides of the yoke 16, whereby angular movement of the latter rotates or rocks the shafts 30 in opposite directions.

Accordingly, rotation of the posts 17 by the worms 26 on the shaft 27 simultaneously adjusts the angular positions of all of the receiving rollers 14 and 15 to adapt them to the helical movement of tubes to be received from the mill 1.

The mechanism for adjusting the heights of the side rollers 15 or guide rollers relative to the bottom supporting roller 14 of each unit is illustrated in Figs. 11 and 12. Each pair of shafts 30 is mounted in a supporting casing 34 that is secured to, or is integral with the top of a vertical column 35 having an intermediate screw-threaded portion 36, and the lower end 37 of which is square in order that the column 35 may be prevented from rotating by a casting 38 that is provided with a square pocket therein to receive the end 37.

A sleeve 40 which surrounds each column 35 has an interior screw-threaded connection to the column 35 and is provided upon its exterior with a worm gear 41 that is driven by a worm 42 mounted on a shaft 43 which is adapted to be turned by a wrench or crank. This arrangement permits of individual adjustment of the heights of the rollers 15 to adapt them for various pipe sizes or to compensate for uneven wear, or to compensate for the raising or lowering of the rollers by tilting.

When it is desired to adjust the height of the side rollers 15 for the purpose of adapting them to properly guide a tube of a given diameter, the shafts 43 are rotated by any suitable means and the worms 42 rotate the sleeves 40 which have screw-threaded connections to the corresponding vertical columns 35, and since the latter are prevented from rotation by means of their square ends 37, the rotation of the sleeves 40 causes the columns to be raised or lowered in accordance with the direction of rotation of the sleeves.

As best shown in Fig. 11, each of the units of the receiving or delivery table 2 comprises a power-driven conveying roller 45 that is rigidly mounted for rotation upon standards 46 secured to channels 47 constituting part of the framework of the delivery table 2.

Both sections of the delivery table are arranged to be adjusted in height by means of a series of jacks 48, Figs. 6 to 9, that are connected for simultaneous operation, but that may be disconnected for individual or relative adjustment.

It may be assumed that a cylindrical blank that has been previously pierced has been threaded by a suitable mandrel, and that the tube and its mandrel are fed to the mill 1 through the hollow guide 12. It may be assumed also that the mandrel is of the type which projects rearwardly beyond the tube and is engaged by a mandrel head which actuates the mandrel and the tube into the mill, but which retains its connection to the mandrel for the purpose of retracting it through the mill when the treated tube has been removed therefrom, as will be described.

The tube and the mandrel progress through the mill, which causes them both to rotate rapidly, and as their forward ends emerge from the mill the tube engages the receiving rollers 14 and is guided by the rollers 15 of the delivery table which have been previously adjusted to such positions that they rotate in planes that substantially coincide with the direction of movement of the contacting surface of the tube. Accordingly, the tube progressively engages the various receiving rollers 14 and the latter permit the tube and the mandrel to rotate freely with little or no relative movement between the engaging surfaces. The rollers 15 serve only as guide rollers and are not constantly in engagement with the tubes.

When the tube has completely emerged from the mill, the cross-rolls of the latter are no longer in engagement with it, and its rotation will quickly cease by reason of the friction which retards the rotation of the rollers 14 and 15 in engagement therewith. When the rotation of the tube and mandrel has ceased, they are separated by means of a mandrel-stripping mechanism illustrated in Fig. 1 and shown in enlarged detail in Figs. 7 and 8. The mandrel-stripping mechanism, which constitutes no part of the present invention, is described and claimed in my copending application, Serial No. 672,250, filed May 22, 1933, and accordingly only such details are described herein as are necessary to an understanding of the present invention.

Figure 7:
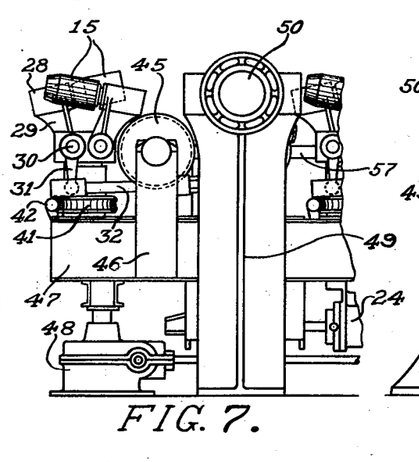
Figs. 7 and 8 are respectively side elevational and vertical cross-sectional views of a portion of the apparatus of Fig. 1, illustrating mechanism for stripping tubes from their mandrels.
Figure 8:
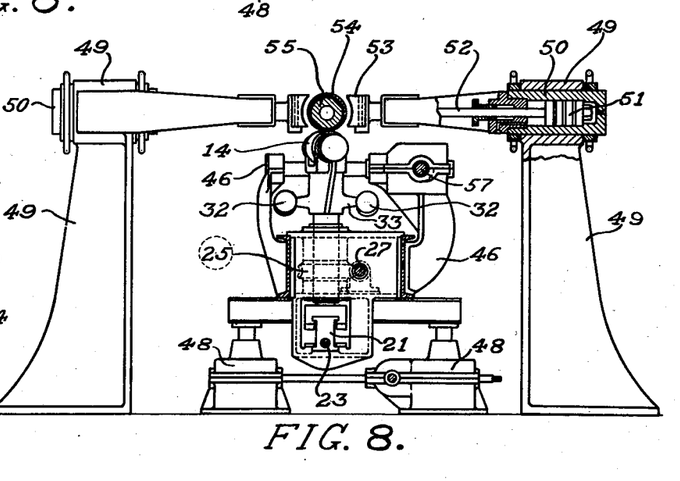

The mandrel-stripping mechanism consists essentially of two standards 49 on which are mounted two horizontally aligned fluid pressure cylinders 50, the pistons 51 of which are connected to plungers 52 each having at the outer end thereof a curved block 53 for engaging the sides of a tube 54 from which a mandrel 55 is to be removed. The blocks 53 are caused to engage the opposite sides of the tubes 54, and to firmly grasp the latter while the mandrel head, not shown, operates to withdraw the mandrel 55 and to retract the latter through the cross-rolls. The blocks may also be used as abutments for the end of the tube while the mandrel is being withdrawn.

Figure 6:
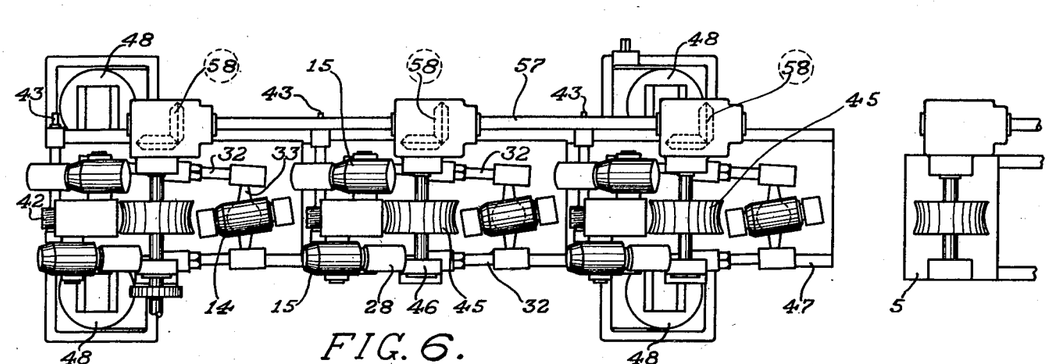
Fig. 6 is an enlarged plan view of a portion of the apparatus of Fig. 1.

When the mandrel has thus been withdrawn, the tube 54 is immediately lowered into engagement with the conveying rollers 45 which are power-driven by a motor 56, Fig. 1, having driving connections to one of the rollers 45 of each section of the table, and the rollers 45 of each section being connected through a shaft 57 and bevel-gear mechanisms 58, Figs. 1 and 6. The tube is lowered by lowering the supporting rollers 14 by means of the wedges 21 previously described to permit the tube to be in engagement with the conveying rollers 45.

Figure 9:
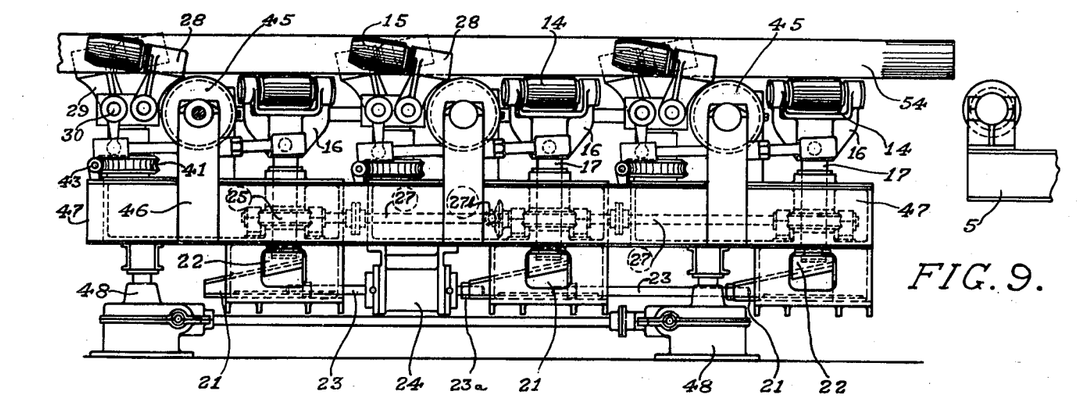
Fig. 9 is an enlarged side elevational view of a portion of the mechanism of Fig. 1, illustrating the receiving rollers for supporting a tube thereon as being above the positions of the conveying rollers.
Figure 10:
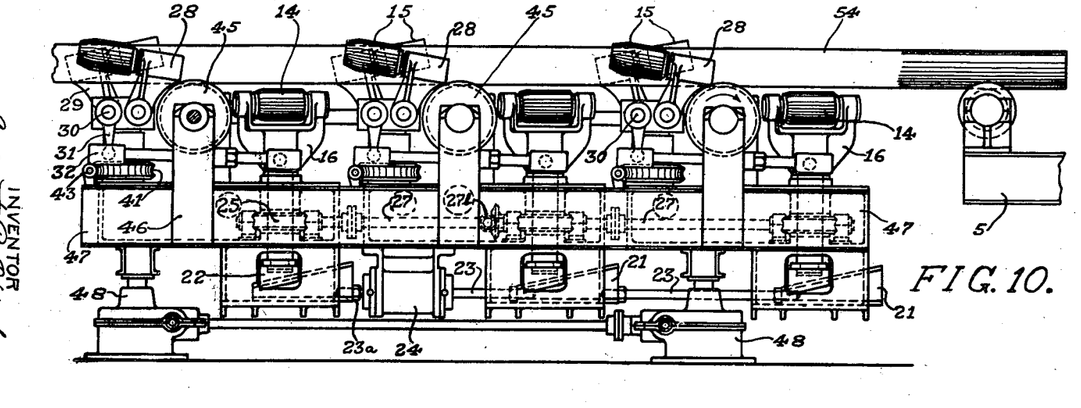
Fig. 10 is a similar view, illustrating the supporting rollers in their lowermost positions to permit the tube to rest upon the conveying rollers.

The different relative positions of the supporting rollers 14 and their actuating mechanisms, including the wedges 21, are best shown in Figs. 9 and 10. In Fig. 9 the tube is supported upon the rollers 14 above the conveying rollers 45, the wedges 21 being in their left-hand positions corresponding to the uppermost position of the rollers 14.

In Fig. 10 the wedges 21 have been actuated to the right to lower the vertical post 17 and the rollers 14, and the tube 54 has been lowered into engagement with the conveying rollers 45. The latter now convey the tube to the right, as viewed in the several figures, and it is transferred to the conveying table 5 by means of which it may be transferred to any suitable or desired location for further treatment or for cooling and storage as desired.

In case the tubes being produced by the mill 1 are actuated by the latter through a different helical path, the angles at which the axes of the rollers 14 and 15 extend with respect to the axis of the tube may be suitably adjusted by means of the mechanism comprising the worm gears 25, worms 26 and shaft 27. The angles of the several receiving rollers 14 and 15 of the different units are simultaneously adjusted in substantially equal amounts.

In case it is desired to vary the horizontal distances between the pairs of guide rollers 15 in order to adapt them for tubes of another diameter, such adjustment may be accomplished by the mechanism shown in Figs. 15 to 18. Each of the shafts 30 which supports one of the rollers 15 is mounted in a block 59 that is slidable within a slideway therefor within the casing 34. The sides of the blocks 59 are provided with spaced semi-cylindrical vertical holes 60 that are adapted to register with similar holes 61 in the walls of the casing 34 and in a partition 62 extending through the central portion of the casing.

The relative positions of either of the blocks 59 and the shaft 30 carried thereby may be determined by suitably registering one of the semi-cylindrical openings 60 in the block with one of the similar openings 61 in the casing 34, and inserting a pin 63 into the cylindrical opening thus formed. It will be noted that the spaces between the semi-cylindrical holes 60 differ from those between the adjacent series of holes 61, somewhat after the arrangement of a vernier scale, whereby a relatively large number of positions for the blocks 59 are provided relative to the casing 34.

A sufficient number of holes extend through the top of the casing 34 to secure the desired adjustment of the shafts 30. A cover 64, Fig. 19, loosely mounted on the corner bolts of the casing 34 prevents scale from the tubes from falling through the holes in the top of casing 34.

Also, in case the diameters of the tubes to be received by the table 2 differ materially from those previously handled, it will be necessary to adjust the height of the rollers 15 with respect to the supporting rollers 14, and this may be accomplished by the mechanism previously described, including the worm gears 41, worms 42, and shafts 43, Fig. 12. After the adjustments of the relative positions of the various rollers, the heights of the sections of the delivery table as a whole may be suitably adjusted by means of the jacks 48.

As previously stated, the gear stand 3 is between the sections of the delivery table 2. It is necessary to provide means for supporting a tube while it is passing over the gear stand, and as shown in Figs. 1 and 2, and in enlarged detail in Figs. 3, 4 and 5, a single roller 65 is mounted on the gear stand 3 for this purpose.

As shown in Fig. 3, the vertical position of the roller 65 is adjusted by means of two stud bolts 66 having screw-threaded portions on which are mounted two gears 67 connected by an intermediate idler gear 68. A hand wheel 69 causes the gears 67 to raise or lower the block 70 on which is supported a base 71 for the roller 65.

As shown in Fig. 4, the base 71 is provided with arcuate slots 72 through which extend clamping bolts 73 for locking base 71 in the position to which it is adjusted to fix the angle of the roller 65.

In order to prevent "whipping" of the tube and mandrel over the gear stand 3, the latter is provided with two spaced stationary guide plates 74, best shown in Figs. 1 and 5. These plates 74 are laterally adjustable by any suitable or convenient means, not shown, and since they are provided for safety only and not for normal engagement with the tubes, they are usually spaced farther apart than the side rollers 15.

Reference may now be had to Figs. 20 to 28, inclusive, in which is illustrated a modified form of my invention. The essential difference between the form of invention previously described and the modification thereof is with regard to the details of mounting and adjusting the positions of certain of the rollers of the delivery table, and accordingly it is not necessary to repeat the illustration of the mill and certain other structures which have been described.

The angular positions of the rollers for receiving the rapidly rotating tubes have been so arranged that their axes are at such angles to the axes of tubes received thereby, that their planes of rotation will approximately coincide with the direction of movement of the contacting surface of tubes received thereby, but these positions are not adjustable. The fixed position of the tubes has been made on the basis of a compromise between the extreme angles of the helical paths of tubes produced by the mill.

In most cases the variation between the angles of the helical paths of the tubes will not be of such degree that any material damage will be caused by the rollers whose angles differ somewhat therefrom, and in such cases the supporting rollers may operate at fixed angles with satisfactory results.

In the operation of the modified arrangement the receiving rollers remain in their vertical positions, while the conveying rollers are adapted to be lowered or raised in order to respectively permit the tube to be received by the receiving rollers and to be subsequently lifted therefrom by the conveying rollers for the purpose of transporting the tube longitudinally away from the mill.

Figures 26, 28:
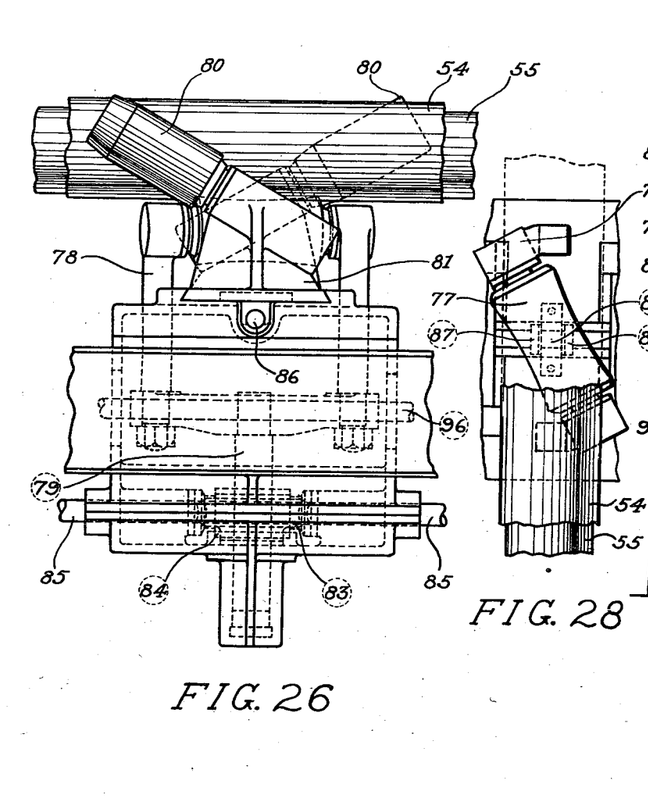
Fig. 26 is an enlarged view in side elevation, illustrating a group of receiving rollers and associated apparatus of the modified form of the invention.
Fig. 28 is an enlarged plan view of a portion of the supporting mechanism for tubes and a portion of the mechanism for adjusting the distances between the side guide rollers.
Figure 27:
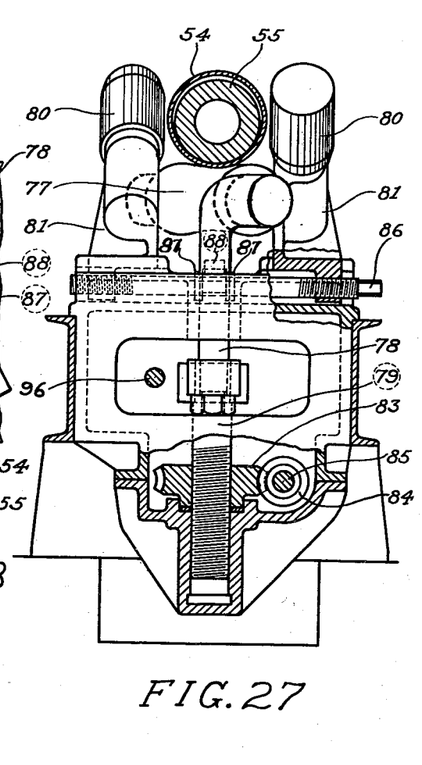
Fig. 27 is a view partially in end elevation and partially in vertical section of the apparatus of Fig. 26, illustrating the details of mechanism for adjusting the height of the bottom-receiving rollers.

As in the previous arrangement the modified delivery table 76 is in two sections comprising a series of units, each consisting of three receiving rollers and a conveying roller. Referring particularly to Figs. 26, 27 and 28, the bottom-supporting roller 77 is mounted upon a yoke 78 at the top of a vertically-adjustable post 79, while the side rollers 80 are mounted on laterally-adjustable brackets 81.

As best shown in Figs. 26 and 27, the height of the bottom-supporting rollers 77 may be adjusted by means of a worm gear 83 having a screw-threaded connection to the post 79, a worm 84, and a shaft 85 for connecting the worm gear mechanisms of the several units for simultaneous adjustment of all of the rollers 77. This arrangement for adjusting the heights of the rollers 77 compensates for variation in diameters of the tubes to be received thereby.

In case of vertical adjustment of the rollers 77, a corresponding adjustment is necessary with respect to the horizontal distance between the pairs of side rollers 80, and such adjustment may be secured by means of a rod 86 that is provided at its opposite ends with right-hand and left-hand screw threads, respectively, for engaging the brackets 81, whereby when the shaft is rotated in one direction it separates the brackets 81 on which the rollers 80 are mounted, and when rotated in the opposite direction the brackets 81 are moved toward each other. The central position of the rod 86 is maintained by two collars 87 thereon that are located on opposite sides of a stationary split bearing block 88 through which the rod 86 passes. While the sections of the table 76 are shown as stationary upon supporting blocks 89, they may be provided with jacks if it is desired to make them vertically adjustable.

Figure 20:
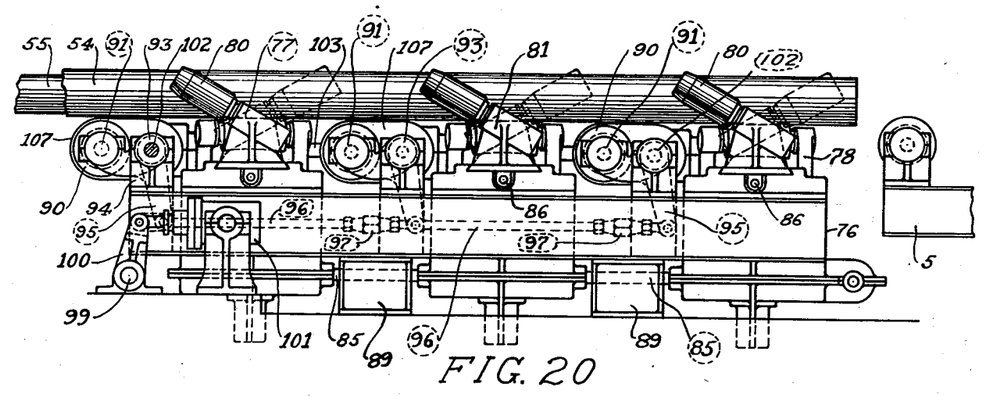
Fig. 20 is a view similar to Fig. 9, illustrating a portion of a delivery table of modified form in which the conveying rollers are vertically movable to engage or disengage the tubes, the conveying rollers being illustrated in their lowermost positions to permit the tube adjacent thereto to rest upon the receiving rollers.
Figure 21:
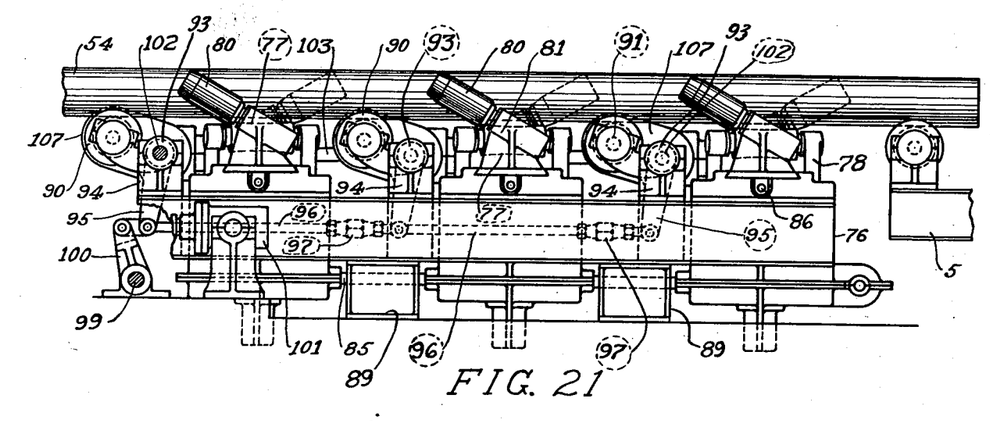
Fig. 21 is a view similar to Fig. 20, in which the conveying rollers are illustrated in their uppermost positions to engage the adjacent tube.
Figures 22, 23, 24, 25:
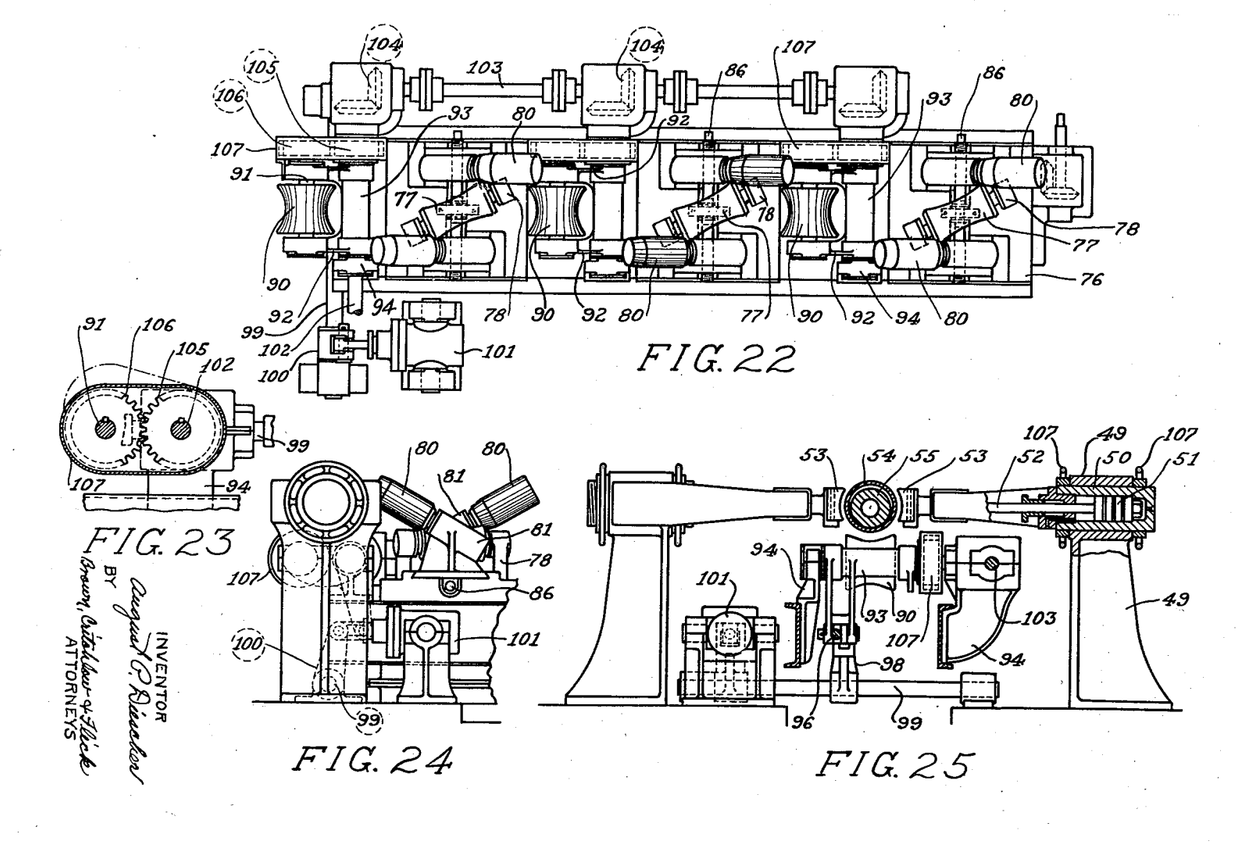
Fig. 22 is a plan view of the apparatus illustrated in Figs. 20 and 21.
Fig. 23 is a vertical sectional view of a portion of the gear mechanism for driving the conveying rollers of Figs. 20, 21 and 22.
Figs. 24 and 25 are views corresponding to Figs. 11 and 12, illustrating the mandrel-stripping mechanism associated with the modified form of my invention.

Referring particularly to Figs. 20, 21 and 22, the conveying roller 90 of each unit is mounted upon a shaft 91 carried by two arms 92 that are fixed upon a hollow rock-shaft 93 sleeved on a shaft 102 mounted in bearings carried by uprights 94 at the sides of the table 76. The shaft 93 has a rocker arm 95 connected thereto. The rocker arms 95 of the several units are connected by links 96, sleeve nuts 97, a rocker arm 98, a shaft 99 and a second rocker arm 100, to the piston of a fluid pressure cylinder 101, whereby the vertical positions of all of the conveying rollers 90 may be controlled simultaneously.

The conveying rollers 90 are driven from one of the shafts 102 which is power-driven and which is connected by gears 105 and 106 to the shaft 91 of one of the rollers 90, and which by means of a shaft 103 and bevel gear mechanisms 104 is connected to gears 105 mounted fast on the other shafts 102 and meshing with gears 106 mounted fast on the other shafts 91. The shafts 91 may thus be swung about the shafts 102, for raising and lowering the rollers 90, without disturbing the driving connection between the shafts 102 and 91. The gears 105 and 106 are indicated in dotted lines in Fig. 22, and a pair of these gears is shown in Fig. 23 with the enclosing casing 107 in section.

In the operation of the latter form of my invention it may be assumed that the various parts of the delivery table 76 are in positions corresponding to those in which they are illustrated in Fig. 20, and the conveying rollers 90 are in their lowermost positions, in which case the tube 54 with the mandrel 55 enclosed therein is received upon the rollers 77 and guided by the side rollers 80. When the tube and its mandrel have ceased rotating, the mandrel may be removed therefrom by means of the mandrel-stripping mechanism illustrated in Figs. 24 and 25 in its relation to the delivery table 76, and which mechanism is identical with that shown in Figs. 7 and 8. The tube 54 is now at rest upon the supporting rollers 77.

The conveying rollers 90 are then actuated upwardly by means of the fluid pressure cylinder 101, which is controlled by the operator in any usual or suitable manner, and its connections to each of the rock-shafts 93 of each of the delivery units, the conveying rollers 90 being rocked about the axes of the shafts 93 and of the power-driven shafts 102. When the links 96 and associated mechanism are actuated to the left, as viewed in Figs. 20 and 21, and the several parts are in the positions illustrated in Fig. 21, the conveying rollers 90 have lifted the tube out of engagement with the supporting rollers 77, and the conveying rollers 90 now operate to convey the tube to the right, as viewed in Figs. 20 and 21, to transport the tube to the conveying table 5. The operation is otherwise similar to that described in connection with the previous form of my invention.

Apparatus constructed in accordance with my invention is adapted to receive rapidly rotating tubes that are actuated by cross-rolls, or to receive any articles of cylindrical shape, and to co-operate to permit such tubes or articles to rotate without danger of marring the outer surfaces thereof as might occur if they were supported or engaged by rollers that rotated about axes that were substantially at right angles to the axis of the tube. The provision of receiving rollers having planes of movement that coincide substantially with the direction of movement of surfaces of the tubes provides that the latter may rotate freely without being in engagement with relatively stationary surfaces, and the delivery of the tubes or other articles is thereby facilitated.

It is not necessary that the conveying rollers be in engagement with the rapidly rotating tubes while they are being projected from the mill, and the conveying rollers may be caused to engage the tubes substantially immediately upon the tubes becoming stationary, whereby the successive operations may occur without loss of time.

While the receiving rollers are adapted to be actuated by the tubes in engagement therewith, it is within the scope of my invention to provide means for driving the receiving rollers in case it is so desired.

The apparatus of my invention is adapted for use in connection with either hot or cold rolling processes for the production of tubes or other cylindrical articles.

The foregoing and other advantages will be apparent to those skilled in the art of constructing and operating apparatus for the purposes described.

I claim:

1. The combination with a pair of cross-rolls for treating metal tubes, of a delivery table comprising a series of spaced horizontally disposed supporting rollers which are arranged at an angle to the axes of the tubes and adapted to rotate about axes substantially at right angles to the direction of movement of the surface of the tubes, a series of opposed vertically disposed guide rollers arranged in staggered relation to said supporting rollers and mounted to contact the tubes at an angle to each other and to the axes of the tubes and to rotate about axes substantially at right angles to the direction of movement of the surface of the tubes, a second series of supporting rollers arranged co-extensively of the first-mentioned set of rollers, means for driving the latter rollers, means for selectively determining which of the series of supporting rollers will engage the tubes, and means for simultaneously adjusting said first-mentioned supporting rollers and said vertically disposed guide rollers to accommodate tubes of different diameters and tubes rotated at different helical angles.

2. The combination with a pair of cross-rolls for treating metal tubes, of a delivery table comprising a series of opposed horizontally disposed supporting rollers arranged at an angle to the axes of the tubes and adapted to rotate about axes substantially at right angles to the movement of the surface of the tubes when engaged in said cross-rolls, a series of opposed vertically disposed guide rollers arranged in staggered relation to said supporting rollers and mounted to contact the tubes at an angle to each other and to the axes of the tubes and to rotate about axes substantially at right angles to the movement of the surface of the tubes when engaged in the cross-rolls, a second series of supporting rollers arranged co-extensively of the first-mentioned set of rollers with their axes disposed substantially at right angles to the axes of the tubes, means for driving the latter rollers, means for vertically adjusting said supporting and guide rollers, means operably connecting each of said first-mentioned supporting rollers with an associated pair of said vertically disposed guide rollers, and means operably connected to all of said latter groups of rollers for simultaneously adjusting their angular position with respect to the axes of the tubes.

3. The combination with a pair of cross-rolls for treating metal tubes, of a delivery table comprising a series of spaced horizontally disposed supporting rollers which are arranged at an angle to the axis of the tubes and adapted to rotate about axes substantially at right angles to the direction of movement of the surface of the tubes, a series of opposed vertically disposed guide rollers arranged in staggered relation to said supporting rollers and mounted to contact the tubes at an angle to each other and to the axis of the tubes and to rotate about axes substantially at right angles to the direction of movement of the surface of the tubes, a second series of supporting rollers arranged coextensively of the first-mentioned set of rollers, means for driving the latter rollers, and means for selectively determining which of the series of supporting rollers will engage the tubes.

4. The combination with a pair of cross-rolls for treating metal tubes, of a delivery table comprising a series of spaced horizontally disposed supporting rollers arranged at an angle to the axis of the tubes and adapted to rotate about an axis substantially at right angles to the direction of movement of the surface of the tubes, a series of opposed vertically disposed rollers arranged to cooperate with said first-mentioned rollers to function as side guides, being mounted to contact the tubes at an angle to each other and to the axis of the tubes and to rotate about axes substantially at right angles to the direction of movement of the surface of the tubes, a second series of supporting rollers arranged coextensively of the first-mentioned set of rollers, means for driving the latter rollers, means for moving the first-mentioned series of supporting rollers above and below the supporting surface of the last-mentioned series of supporting rollers, and means for adjusting the first-mentioned supporting rollers and the guide rollers associated therewith to accommodate tubes of different diameters and tubes rotated at different helical angles.

5. The combination with a cross-roll tube mill, of a delivery table comprising a series of spaced horizontally disposed supporting rollers which are arranged at an angle to the axis of the tubes and adapted to rotate freely about an axis substantially at right angles to the direction of movement of the surface of the tubes, a second series of supporting rollers arranged coextensively of the first-mentioned set of rollers, a series of opposed vertically disposed guide rollers uniformly spaced from the center of the rolls of both series of supporting rollers, means for raising and lowering said first-mentioned series of supporting rollers above and below the supporting surface of said second-mentioned series of supporting rollers, and means for adjusting said first-mentioned series of supporting rollers and said vertically disposed guide rollers to accommodate tubes of different diameters and tubes rotated at different helical angles.

AUGUST P. DIESCHER.